Dec. 24, 1935.                    C. A. EVERETT                    2,025,160
LUG BOX HANDLE
Filed Aug. 20, 1934
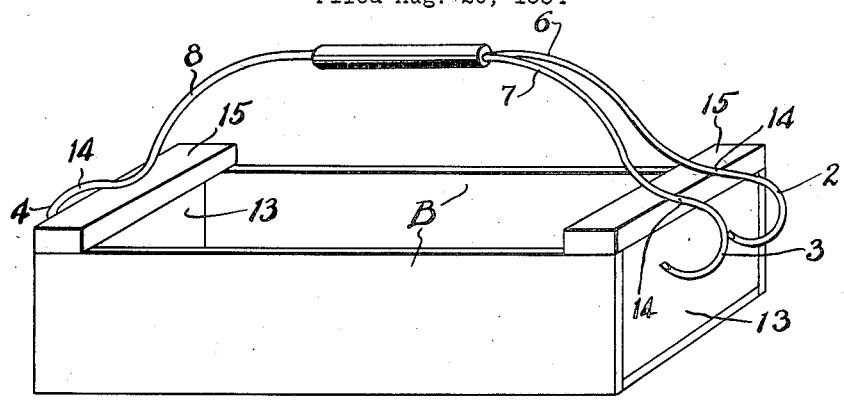
Fig.1
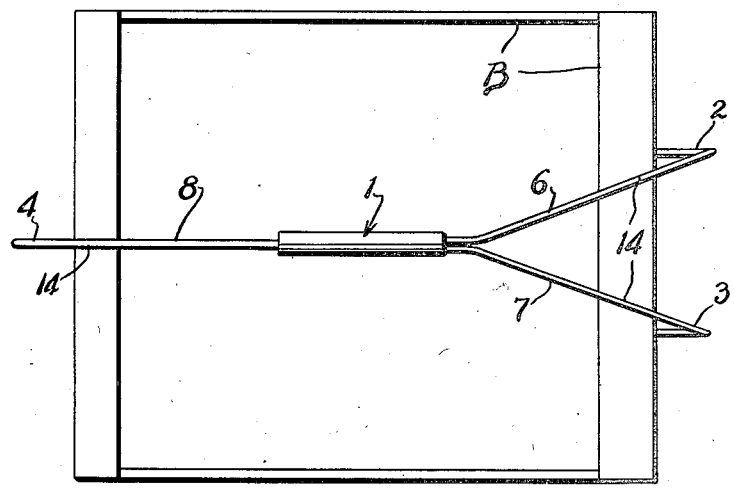
Fig.2
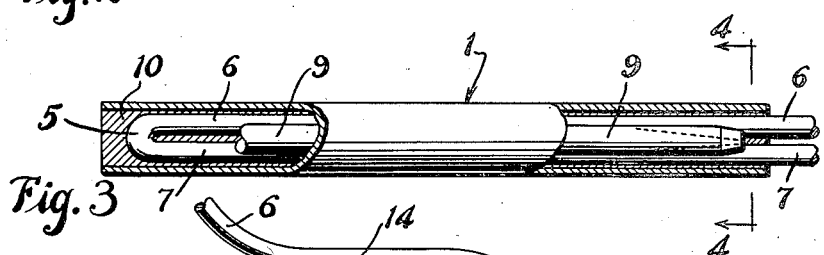
Fig.3
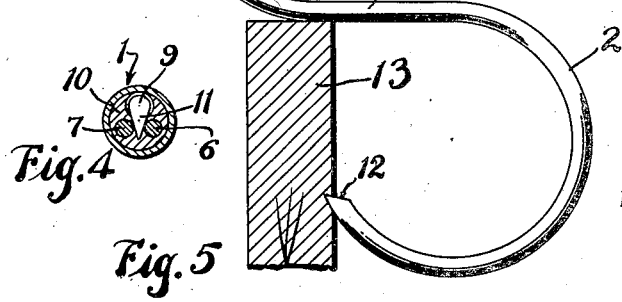
Fig.4
Fig.5
INVENTOR.
Clarence A. Everett
BY
ATTORNEY.

Patented Dec. 24, 1935

2,025,160

UNITED STATES PATENT OFFICE 2,025,160

LUG BOX HANDLE

Clarence A. Everett, Moorpark, Calif.

Application August 20, 1934, Serial No. 740,630

5 Claims. (Cl. 294—16)

This invention has for an object the provision of a simple, economical and effective box handle which may be quickly attached to and detached from boxes, cartons or bales whereby the same may be transported from place to place.

More particularly, it is an object to provide a detachable handle especially adapted for use in connection with fruit and vegetable boxes commonly known as "lugs" in which the fruit and vegetables are packed for the market, whereby the lug boxes may be employed for picking receptacles in lieu of the usual buckets or pails ordinarily used for such purposes.

It will be understood that in the picking, packing and handling of fresh perishable fruits and vegetables, such as peaches, pears, apricots, tomatoes and even potatoes, too much handling bruises and often breaks the skins and causes rapid deterioration of such products. When the fruit and vegetables are picked and first placed in buckets it is necessary to transfer them into ordinary lug boxes for transportation to the markets. Thus, the fruit and vegetables are unnecessarily handled and bruised.

Accordingly, I have provided a handle which may be readily attached to and detached from the usual lug box so that the fruit and vegetables may be placed in the box as they are picked, thus eliminating the transfer from one receptacle to another.

A handle embodying my improvements preferably includes a plurality of gripping members having sharp pointed extremities for engagement with the ends of a lug box or the like, a tubular handle member centrally mounted between the gripping portions and means for locking and sealing the inner extremities of the gripping members in the handle member against displacement or movement.

I prefer to provide a pair of gripping members at one end of the handle and one or more at the other end, formed of resilient wire and bent inwardly of the gripping extremities so that when pressure is applied to the handle the gripping portions may be spread apart and detached from the box. Moreover, the bends in the handle are so formed that when the handle is positioned on a box the box will be incapable of swinging on the handle, thereby providing rigidity and preventing displacement of the fruit from the box.

Other objects may appear as the description progresses.

In the accompanying drawing I have shown a preferred form of handle, subject to modification within the scope of the appended claims without departing from the spirit of my invention.

In said drawing:

Fig. 1 is a perspective view of a handle embodying my improvements shown attached to an ordinary lug box;

Fig. 2 is a top plan view of the same;

Fig. 3 is an enlarged plan view of the handle proper, partly in section;

Fig. 4 is a transverse section of the handle on line 4—4 of Fig. 3; and

Fig. 5 is an enlarged section of an end of a box and one of the handle gripping members in operative engagement therewith.

As shown, my handle includes a central handle member 1 of tubular cross section forming a hand grip, and a pair of spring steel wire members formed so as to provide a pair of gripping portions 2 and 3 at one end and a single gripping portion 4 at the other end of the device.

By reference to Fig. 3 it will be observed that the portions 2 and 3 are formed at opposite extremities of a single piece of wire which is bent at 5 at a point centrally between the portions 2 and 3 so that the legs 6 and 7 thereof are parallel and are thus adapted to be inserted longitudinally in the tubular handle member 1. Intermediate the end of the member 1 and the gripping portions 2 and 3 the legs 6 and 7 are spread apart, as shown in Fig. 1, so that the portions 2 and 3 will be substantially spaced apart.

The gripping portion 4 is formed on an extremity of a single piece of spring steel wire and has its inner portion 8 bent to correspond to the portions 6 and 7 and is further provided with a straight stem 9 which extends substantially into and nearly through the handle member 1, as shown, and is so positioned in the member 1 that it will nest centrally on the portions 6 and 7 of the other wire member.

It is obvious that the portions of the gripping members which are extended from the handle member 1 are of the same length and form and in order to make the handle thus assembled effective and rigid I fill the space within the member 1 with a suitable molten metal, wax or other element, as at 10, such as solder, which will unite with the metal parts and prevent the turning of the members within the handle and the displacement of said members therefrom.

The end 11 of the stem 9 may be pointed and bent downwardly, as shown in Fig. 4, so as to seat in the space between the portions 6 and 7 of the bifurcated member, thereby providing a lock within the handle member.

As shown in Fig. 5, the gripping portions 2, 3, and 4 are in the form of loops of substantial diameter with the extremities thereof bevelled at 12 so as to provide sharp points for slightly piercing the ends 13 of a box B. Upwardly of the loops the intermediate portions of the wire gripping members are extended inwardly in substantially horizontal planes as at 14 over the upper edges of the box ends 13 or so as to overlie transverse cleats 15 which are usually provided at the tops of the boxes.

In operation, when a box B is positioned on a flat surface the handle is attached thereto by positioning the device over the top and ends of the box and then applying pressure to the member 1, thereby spreading the portions 2, 3, and 4 apart longitudinally with the portions 14 overlying the ends of the box. When the handle is properly positioned with the grip 4 engaging a central point between the sides on one of the ends 13 of the box and the opposite pair of grips 2 and 3 straddling a central point on the other end 13 of the box, pressure on the handle is relieved and the gripping points 12 will slightly pierce and affix themselves to the ends of the box, as shown in Fig. 5.

With the portions 14 resting upon the upper edges of the box ends the box may be readily carried from place to place while the fruit or vegetables is being picked and placed therein, and subsequently marketed in the boxes, thus eliminating the transfer of the contents of the box for marketing.

The handle is detached from a box by applying pressure to the member 1 and then slipping the gripping portions out of engagement with the box ends.

What I claim is:

1. A box handle comprising a plurality of tensioned gripping members provided with gripping extremities for detachable engagement with opposite portions of a box or the like and having inner portions extended into overlapping relation at a point above and intermediate the gripped portions of the box to form a central handle for the box, the inner portion of one of said members being bent backwardly upon itself and the inner portion of the other member being interlocked therewith.

2. A box handle comprising a plurality of tensioned gripping members having overlapping central portions, one of which has a pair of parallel spaced sections and the other having a portion locked therebetween, and oppositely extended portions formed with grips at their extremities for engagement with opposite portions of a box or the like, and a tubular handle member encompassing said overlapping portions.

3. A box handle comprising a plurality of tensioned gripping members having overlapping central portions, one of which has a pair of parallel spaced sections and the other having a portion locked therebetween, and oppositely extended portions formed with grips at their extremities for engagement with opposite portions of a box or the like, and a tubular handle member encompassing said overlapping portions, and means within said handle member for sealing and locking said overlapping portions against relative movement.

4. A box handle comprising a handle member, a single gripping member extended therefrom at one end, a bifurcated gripping member extended therefrom at the other end, one of said members having two parallel sections and the other member having a single section interlocked in said handle for securing said gripping members against movement within and relative to said handle member, said gripping members having correspondingly formed loops with gripping extremities adapted to engage opposite portions of a box or the like, so that when pressure is applied to said handle member the gripping members may be detached from the box.

5. A box handle comprising a tubular handle, a pair of gripping members one of which has parallel portions and the other of which has a single portion and interlocked with said parallel portions enclosed by said handle member, and gripping extensions outwardly of the handle member provided with extremities for engagement with opposite portions of a box or the like, and means including a fusible element filling the space within said handle member around said portions of the gripping members for sealing said members in said handle.

CLARENCE A. EVERETT.